July 8, 1969 ICHIRO ISHII 3,454,387

METHOD OF PRINTING AND BAKING SCALES ON GLASS THERMOMETERS

Filed Aug. 9, 1965

Ichiro Ishii
INVENTOR.

BY George B. Aufen
Attorney

United States Patent Office 3,454,387
Patented July 8, 1969

3,454,387
METHOD OF PRINTING AND BAKING SCALES ON GLASS THERMOMETERS
Ichiro Ishii, Tokyo, Japan, assignor to Jintan Terumo Co., Ltd., Tokyo, Japan, a corporation of Japan
Filed Aug. 9, 1965, Ser. No. 478,260
Claims priority, application Japan, Aug. 10, 1964, 39/45,532, Patent 40-7,075
Int. Cl. C03c 17/26
U.S. Cl. 65—60                                           2 Claims

ABSTRACT OF THE DISCLOSURE

A method of printing and baking a scale on a semi-finished thermometer wherein the printing ink consists of staining material, and a binder of chlorinated rubber and linseed oil, wherein the scale is transferred by a resilient pad from an etched plate to the thermometer.

---

Figure 1:
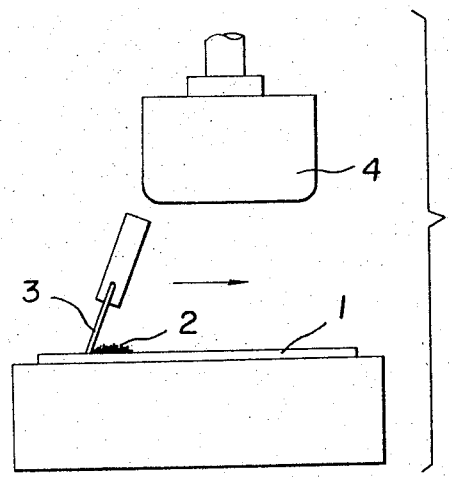
Figure 2:
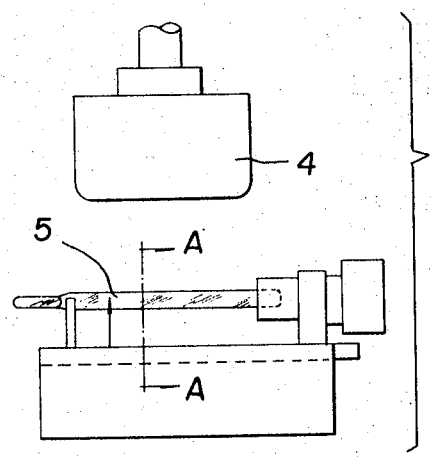
Figures 3A, 3B, 3C:
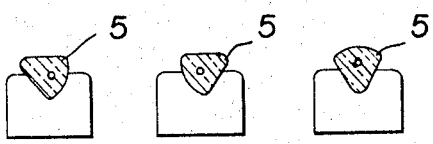

This invention relates to a method of accurately forming stained marking scales, characters and/or letters on the surface of a glass thermometer to provide extremely clear and accurate indications, and more particularly to a new and improved method of printing and baking scales on glass thermometers which is especially suitable for mass production process.

Scales provided on the surface of glass thermometers are required to give as far as possible fine, clear accurate and correct indications of temperatures. It is also necessary to preserve colored scales in a clear state for a long time. In addition the surfaces of the scales are required to be smooth, and capable of being readily sterilized and rinsed.

The etching method of the prior art which has been utilized for a long time to mark scales on thermometers and wherein the surfaces of the stem of the thermometers are etched to provide scales is not only unsatisfactory in accuracy and clearness of the scales formed but also unsuitable for mass production process in view of dangerous operations involved. Therefore, this method is not suitable for modern production processes which require improved quality and effective production.

There are ordinary method of printing and baking markings on glass articles. These methods are utilized to mark scales on the surfaces of glass thermometers but in providing fine, clear and accurate scales on small curved surfaces as in thermometers, especially clinical thermometers, a highly skilled technique is required. Moreover a special printing technique is required in order to solve various problems involving strain of the glass tube caused by high temperature baking of the printed ink, error of indication caused by such a strain, expansion of mercury in the mercury bulb, deformation of capillary tube and construction part due to heat and the like. Thus, these problems can not be solved by mere application of ordinary printing and baking techniques.

For example, the screen printing method can not provide fine and sharp scales since by this method the original scale is printed on the surface of a glass tube through a fine screen, so that this method is not suitable for clinical thermometers which require fine scale lines of 0.1 to 0.15 mm. width. Moreover the screen is gradually deformed owing to stress produced at the time of printing, thus decreasing clearness of the printed scale after a limited time interval. Thus, it will be clear that this method is not suitable for mass production process where a very large number of products are continuously printed.

It is also difficult to provide accurate prints on thermometers of small radius of curvature by emboss printing method wherein an engraved plate provided with engraving of the desired scale lines, numerals and/or letters is used to repeatedly transfer print them on the surface of the glass tube, so that there are many problems where well defined fine scale lines are to be transfer printed in large quantities. It is possible to faithfully reproduce the scale line and the like of the engraved plate only when visco-elasticity of the printing ink which does not exhibit Newtonian flow on the curved surface of thermometers is needed when there are to be compressed by the printing roll, subjected to hardness and elasticity of the transfer roll, thickness of the engraved plate and other such factors.

As a result of extensive research I have discovered a new and improved method of forming stained marking scales on thermometers which is suitable for mass production processes to produce products having surface thereof and attractive appearance and can operate effectively.

The plate to be used in the printing step is preferably made of metal or other hard materials which can preserve scales, letters and numerals provided thereon for a long period and many types of engraved plates are prepared to correspond to the indications previously pointed.

The transfer printing pad is preferably made of a material having the Shore hardness of 6–25, and large flexibility, elasticity and adhesiveness by taking into consideration such factors as the adsorption of the printing ink applied upon the engraved plate, the flexibility required to correctly transfer print the adsorbed printed ink onto the surface of the thermometer and the compatibility with the curved surface. Accordingly it is advantageous to use resilient printing means essentially made of hydrated gelatin or glyceric acid.

The ink utilized in connection with the staining must be readily deformed when applied to the engraved surface of the engraved plate and then transferred to the surface of the thermometer but can be restored to its original state. Accordingly it is desirable to use inks exhibiting high degree of thixotropy and of high visco-elasticity. An example of the ink comprises the following composition.

| Coloring group (A): | Part |
|---|---|
| Silver sulphide | 1 |
| Copper sulphide | 1.5 |
| Cuprous oxide | 0.5 |
| Lead borate | 0.25 |

The mixture of the above composition is pulverized to have a grain size of about 350 meshes.

| Binder group (B): | Part |
|---|---|
| Chorinated rubber | 0.3 |
| Linseed oil | 1.0 |

The binder of the above described composition is heated for a long time to form a gel.

100 parts of the coloring group (A) is mixed with 25 parts of the binder group (B) and the mixture is reheated to obtain a gel like staining ink having high visco-elasticity.

This invention can be more fully understood from the following description taken in connection with the accompanying drawing in which:

FIGS. 1, 2, 3a, 3b, and 3c, show schematic views of various printing steps of the method of this invention.

Referring first to FIG. 1 a staining ink 2 is applied by means of a doctor knife 3 onto the surface of an engraved plate 1 engraved with the desired scales, numerals and letters. The ink in the form of a sol is uniformly and densely applied into every corner of the engraving and then immediately converted into gel. As a result when a resilient printing pad 4 made of a substance having suitable absorptive and flexible characteristics is pressed against the plate 1, well defined letters, scales and the like corresponding to the engravings on the surface of the plate 1 are transferred on the surface of the printing pad which are in turn transferred on to the curved surface of a thermometer 5. During this transfer while the ink is deformed by being converted into sol by the printing pressure, it will immediately be restored to its original state by being converted into gel upon removal of the printing pad. Thus what is needed is not only an ink having Newton's flow property but also needed is an ink exhibiting visco-elasticity deformable during the transfer printing when the ink is transferred from the plate to the pad and then from the pad to the curved surface of the thermometer. It is obvious that the pressure applied by the pad to the curved surface of the thermometer must be carefully controlled. However, this operation can be greatly simplified by the use of a highly thixotropic ink of superior restoring property and by use of the pad. As a result this invention is very suitable for use in mass production lines. It should also be understood that the staining ink described is a mere illustrative example and that the composition and the ratio of ingredients especially of the binder group may be suitably varied in order to provide the desired visco-elasticity showing high degree of thioxotropy.

Thermometers which have been transfer printed in the above described manner are then subjected to the firing step. During the firing step only the portions of the thermometers on which scales and the like have been printed are inserted in a heating furnace with their mercury bulbs covered by water absorbing covers such as fibrous material and suitably cooled (to a temperature below 20° C.) by dropping and impregnating with cold water. In this manner the printed portions can be heated so as to bake the printed ink for from several minutees to several tens of minutes without causing any appreciable heating and expansion of mercury bulbs. Infrared rays may be used for the heating and a cover is needed for supporting the heating element in position above those portions of the thermometers on which the scales are to be baked so as to heat said portions at a temperature close to the transition point of glass. A suitable connection of heat due to circulation of air can be ensured by proper selection of the position of the heating element, configuration of the cover of the heating surface to provide adequate radiation and the gap between the outer edge of the cover and the thermometer. Thus, the intermediate portion between the cooled mercury bulb and the baked portion is maintained at an intermediate temperature which is lower than about 180–200° C. at any point along the intermediate portion, thus establishing a uniform temperature gradient effective to prevent strain.

By this means the mercury which has been shaken into the mercury bulb prior to the baking step is preserved in the bulb and is prevented from rising into the capillary tube. Thus the substantially empty capillary tube and the scale portion of thermometer are subjected to the baking temperature so that there is no fear of causing changes in the volumes of the capillary tube and of the suspension point due to the pressure caused by the expansion of mercury and evolution of decomposed gas. Accordingly, it is possible to finish the baking operation without introducing any error factors to the temperature indication of the printed scale since undesirable phenomena such as decrease in the quantity of mercury due to rise thereof or formation of gas bubbles do not occur. Also since thermometers are baked in a semi-finished state, finished products can be obtained by merely increasing the baked scales following to cooling without the necessity of additional steps such as removal of vacuum chamber as in the prior methods.

The following examples are given to illustrate this invention.

EXAMPLE 1

A thermometer of semifinished state was prepared by introducing a required quantity of mercury into a capillary tube which has been provided with a mercury bulb and a constriction part by a conventional method and then sealing the open end of the capillary tube. Two temeprature points corresponding to 36° C. and 42° C. where then pointed. An engraved plate 1 was prepared having a scale line of 0.1 mm. width and accurately aligned with these marks. 100 parts of the coloring group comprising a mixture of silver sulphide, copper sulphide and lead borate acting as the coloring catalyst and 25 parts of the binder group comprising chlorinated rubber and linseed oil were mixed together and then heated to form a gel. The highly visco-elastic staining ink 2 thus obtained was then applied onto the engraved plate 1 by means of a doctor knife 3 as shown in FIG. 1.

Thereafter a resilinet pad 4 made of hydrated gelatin and having the Shore hardness of 15 was pressed against the plate to receive the printing ink which in turn was printed on the curved surface of a thermometer. The printed thermometer was then baked at a temperature of 410° C.±3° C. for 15 minutes with its mercury bulb-cooled to 16° C., and slowly cooled over a period of 15 minutes. For mass production a plurality of successive thermometers are conveyed through a heating furnace by means of a conveyor. It was found that the error of the temperature indication of thermometers produced by this method is only 1/100° C.

EXAMPLE 2

The same procedure as in Example 1 was repeated except that silver stain ink or paint was used and the portion printed with the scale was baked at a temperature of from 400 to 520° C.

What is claimed is:
1. A method of forming stained marking on a glass thermometer tube having a mercury bulb at one end thereof comprising the steps of filling staining ink into the grooves of an engraved plate to carry an engraved mark pattern, said staining ink being thixotropic gel and consisting of solid particles of stain producing materials, chlorinated rubber and linseed oil; pressing a resilient pad having a substantially plane effective surface against the surface of said engraved plate at a sufficient pressure to convert said staining ink into sol thereby to transfer said staining ink from the surface of said engraved plate to the effective surface of said pad; pressing said pad against the surface of said thermometer tube at a sufficient pressure to convert the form of said staining ink into sol thereby to tranfer said staining ink from the surface of said resilient pad to the surface of said tube and heating the marked portion of said thermometer tube to cause said staining ink to penetrate into the body of said tube while cooling said mercury bulb.

2. The method of staining a scale on a semi-finished glass thermometer according to claim 1 wherein said staining ink is a mixture of 100 parts of a coloring group consisting of 1 part of silver sulphide, 1.5 part of copper sulphide, 0.5 part of cuprous oxide and 0.25 part of lead borate and 25 parts of a binder group consisting of 0.3 part of chlorinated rubber and 1.0 part of linseed oil.

References Cited

UNITED STATES PATENTS

| 2,760,761 | 4/1955 | Douglas | 219—19 |
| 2,748,696 | 6/1956 | Murray | 101—41 |
| 2,811,040 | 10/1957 | Blackman et al. | 73—371 |

S. LEON BASHORE, *Primary Examiner.*

J. H. HARMON, *Assistant Examiner.*

U.S. Cl. X.R.

65—30; 106—20, 28, 34